No. 738,598. PATENTED SEPT. 8, 1903.
J. V. BERRY.
NUT LOCK.
APPLICATION FILED JUNE 26, 1903.
NO MODEL.
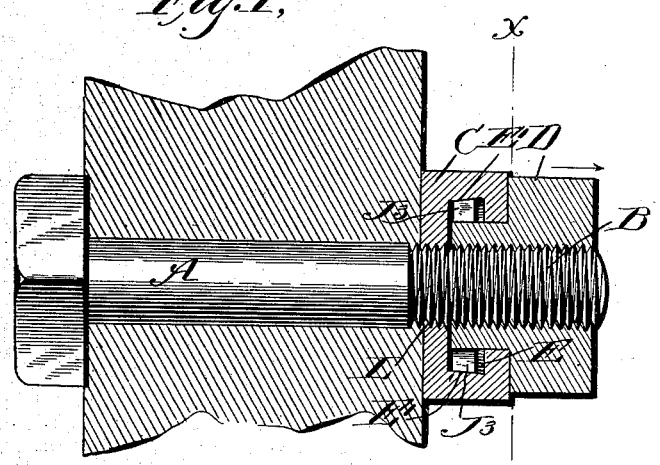
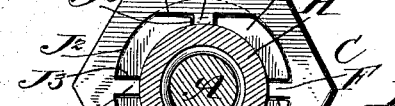
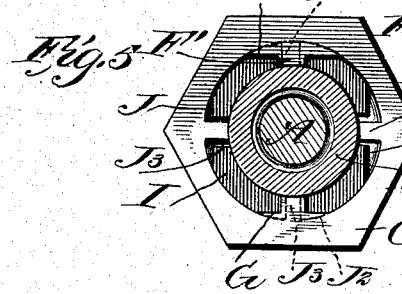
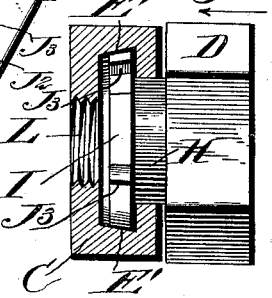
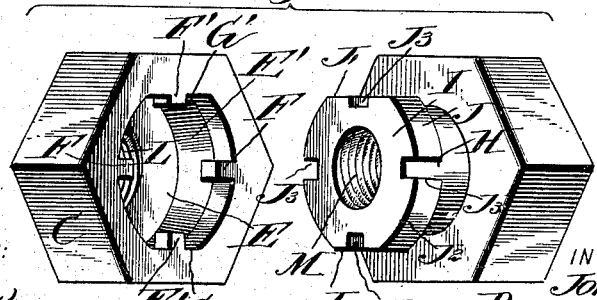
WITNESSES:
G. P. Kingsbury
Harrison B Brown
INVENTOR
John V. Berry.
BY Munn & Co.
ATTORNEYS.

No. 738,598. Patented September 8, 1903.

UNITED STATES PATENT OFFICE.

JOHN V. BERRY, OF SHAMOKIN, PENNSYLVANIA, ASSIGNOR OF ONE-HALF TO CHARLES A. BARRON, OF SHAMOKIN, PENNSYLVANIA.

NUT-LOCK.

SPECIFICATION forming part of Letters Patent No. 738,598, dated September 8, 1903.

Application filed June 26, 1903. Serial No. 163,171. (No model.)

*To all whom it may concern:*

Be it known that I, JOHN V. BERRY, residing in Shamokin, in the county of Northumberland and State of Pennsylvania, have invented certain new and useful Improvements in Nut-Locks, of which the following is a specification.

This invention relates to an improvement in screws and nuts, and more particularly to the subclass known as "nut" and "bolt" locks.

The object of the invention is to furnish a ready and efficient means of securing in any desired position nuts to bolts in such a manner that the nuts may not become loosened by jarring or by any turning of the bolts or other parts to which they are attached.

With these objects in view the invention resides, essentially, in the various arrangement and combination of the parts, as hereinafter more fully set forth, and the novel features pointed out in the claims.

The invention is illustrated in the accompanying drawings, forming a part of this specification, and in which—

Figure 1 is a view illustrating my invention in use, the locking-nuts being shown in section. Fig. 2 is a detail view of the locking-nuts with the lower nut in section. Fig. 3 is a perspective view showing the locking-nuts separated and in position ready for connection. Fig. 4 is a sectional plan view taken on line $x\ x$ of Fig. 1, and Fig. 5 is a similar nut with the parts shown adjusted to locking position.

In the drawings, A represents a bolt having for a portion of its length right and left screw-threads B, substantially as shown in Fig. 1.

In practicing my invention I employ a locking-nut constructed in two parts, consisting of a lower member C and an upper reduced member D. The lower member C is constructed with a substantially annular recess E, having inwardly-projecting lugs F F' and parallel flat side edges G G', the latter of which is the longer, as clearly shown in Figs. 3, 4, and 5. It will be noticed that the lugs F' are shorter than the similar lugs F and that the lugs F' on the side edge G' is the shorter of the two said lugs F'. The side walls of the recess E in the lower member C are formed inclining, as indicated at E'. (See Fig. 2.)

In further carrying out my invention I provide the outer member D with a depending neck H, having an enlarged head I at its lower end. (See Figs. 1, 2, and 3.) The head I is formed with two parallel flat side edges J J', the latter being the longer and both thereof being made conforming with but slightly shorter than the conforming flat edges G G' of the recess E, as best shown in Figs. 3 and 4. The head I has rounding edges $J^2$ and notches $J^3$ therein. (See Figs. 3 and 4.)

It will be understood that the members C and D of my locking-nut have internally-screw-threaded openings L M in the respective members and that the threads in the opening M are of reverse direction to the threads in the opening L.

In using my improved locking-nut its lower member C is started on the right threaded end B of the bolt A and turned thereon until the forward end of the bolt is about to enter the threaded opening M in the member D, the latter being pulled out and its head I adjusted to position in the greater diameter of the recess E in the member C, as shown in Fig. 2. In this position of the parts the member D is imparted a slight turn in reverse direction to which the member C was turned. This action will screw the member D on the reverse or left threads of the bolt. Obviously this action of the member D will cause it to move closer to the member C; but it is apparent that the turning action imparted to the member D should be limited to prevent binding action of the head I with the inclined side walls E' of the recess E, which latter action takes place when the member D is screwed home—that is, in contact with the member C. Now continue turning first the member C to the right and the member D to the left. Both members will be screwed on the bolt until the member C is in engagement with the work or securing position. In this position of the parts, which would be as shown in Fig. 2, the two members may be locked against loosening from jarring action or any turning thereof by a slight turn of the member D, effecting adjustment of the head I in the recess E to position with its side edges in frictional contact with the inclined sides E' of the recess E, and thereby operating to prevent reverse or backward turning of the member D. This position of the parts is shown in Figs. 1 and 5. The relative position of the head I with its entrance into the recess E is indicated in Fig. 4. Fig. 5 shows the head I with its curved edges $J^2$ turned under the projecting flat parallel side edges G G' of the recess E.

The reduced outer member D (see Fig. 1) enables grasping of the inner member C with a wrench, whereby it may be turned without action on the member D. In other words, with this construction of the members the under thereof is adapted to be turned and then the outer thereof be turned with action of the wrench upon one member, as will be understood.

Having thus described my invention, what I claim as new, and desire to secure by Letters Patent, is—

1. A nut-lock consisting of a right and left screw-threaded bolt, and a locking-nut constructed in two members, one thereof having right and the other left screw-threads as specified, an annular recess in one member, inwardly-projecting lugs and parallel overhanging flat edges in said recess, a depending neck on the other member, with a head at its lower end having parallel flat edges and curved portions, and notches in the edges of the head, substantially as described.

2. A nut-lock consisting of a right and left screw-threaded bolt and a locking-nut constructed in two members, one thereof having right and the other left screw-threads, as specified, an annular recess in one member, inwardly-projecting lugs and parallel overhanging flat edges in said recess, one said overhanging edge being the longer, a depending neck on the other member, a head at the lower end of said neck, parallel flat edges and curved portions on said head, one of which flat edges on the head being the longer, and notches in the edges of the head, substantially as described.

3. A nut-lock consisting of a right and left screw-threaded bolt, and a locking-nut constructed in two members, one thereof having right and the other left screw-threads as specified, an annular recess in one member having inwardly-inclined side walls, inwardly-projecting lugs and parallel overhanging flat edges, in said recess, a depending neck on the other member, a head at the lower end of said neck, having parallel flat edges and curved portions, and notches in the edges of the head, substantially as described.

4. The combination with a right and left screw-threaded bolt, of a locking-nut consisting of two members one thereof having right and the other left screw-threads, said members being constructed with connecting means having limited separating movement and means effecting binding action between them when they are screwed home to locking position substantially as described.

JOHN V. BERRY.

Witnesses:
WM. E. RESSLER,
GEO. W. RYON.